(12) United States Patent
Ruef et al.

(10) Patent No.: US 7,539,504 B2
(45) Date of Patent: May 26, 2009

(54) WIRELESS TELEPRESENCE COLLABORATION SYSTEM

(75) Inventors: Adam Taylor Ruef, Plano, TX (US); Robert Earl Nimon, Dallas, TX (US); John Charles Radford, Coppell, TX (US)

(73) Assignee: ESPRE Solutions, Inc., Plano, TX (US)

( * ) Notice: Subject to any disclaimer, the term of this patent is extended or adjusted under 35 U.S.C. 154(b) by 942 days.

(21) Appl. No.: 10/307,613

(22) Filed: Dec. 2, 2002

(65) Prior Publication Data

US 2003/0104806 A1    Jun. 5, 2003

Related U.S. Application Data

(60) Provisional application No. 60/336,014, filed on Dec. 5, 2001.

(51) Int. Cl.
*H04Q 7/20* (2006.01)

(52) U.S. Cl. .................. 455/508; 455/507; 345/8; 709/204

(58) Field of Classification Search .............. 455/423, 455/424, 552.1, 556.1, 557, 566, 575.1, 575.2, 455/507, 508; 709/204; 345/8
See application file for complete search history.

(56) References Cited

U.S. PATENT DOCUMENTS

| | | |
|---|---|---|
| 3,919,475 A | 11/1975 | Dukich et al. |
| 4,605,959 A | 8/1986 | Colbaugh |
| 4,750,197 A | 6/1988 | Denekamp et al. |
| 4,771,865 A | 9/1988 | Hinderling |
| 4,845,636 A | 7/1989 | Walker |
| 4,847,894 A | 7/1989 | Chanvin et al. |
| 4,962,473 A | 10/1990 | Crain |
| 4,965,819 A | 10/1990 | Kannes |
| 5,005,213 A | 4/1991 | Hanson et al. |
| 5,010,399 A | 4/1991 | Goodman et al. |
| 5,164,979 A | 11/1992 | Choi |
| 5,202,759 A | 4/1993 | Laycock |
| 5,382,943 A | 1/1995 | Tanaka |
| RE34,895 E | 4/1995 | Morotomi et al. |
| 5,441,047 A | 8/1995 | David et al. |
| 5,452,289 A | 9/1995 | Sharma et al. |
| 5,462,051 A | 10/1995 | Oka et al. |
| 5,546,072 A | 8/1996 | Creuseremee et al. |
| 5,553,609 A | 9/1996 | Chen et al. |
| 5,619,183 A | 4/1997 | Ziegra et al. |
| 5,671,158 A | 9/1997 | Fournier et al. |
| 5,697,834 A | 12/1997 | Heumann et al. |

(Continued)

*Primary Examiner*—Temica M Beamer
(74) *Attorney, Agent, or Firm*—Scott T. Griggs; Griggs Bergen LLP

(57) ABSTRACT

A method and system providing wireless personal telepresence facilitating collaboration by two or more persons, each in different locations, on a task at one of the locations and requiring visualization by multiple persons. A portable wireless unit captures/transmits video depicting the technician's first-hand field of view while keeping her hands free to perform the task. The expert employs a management console for visualization of the task being performed by the technician while communicating in real time with the technician. The management console also provides control over video and audio functions including record, playback, freeze frame and image attributes. Communication between the two persons is accomplished by exchanging digitally compressed video and audio via a voice or data network, either public or private. A community server augments the system by supporting three or more participants and enabling communication across public networks.

20 Claims, 7 Drawing Sheets

U.S. PATENT DOCUMENTS

| | | |
|---|---|---|
| 5,726,660 A | 3/1998 | Purdy et al. |
| 5,793,416 A | 8/1998 | Rostoker et al. |
| 5,801,755 A | 9/1998 | Echerer |
| 5,810,747 A | 9/1998 | Brudny et al. |
| 5,812,054 A | 9/1998 | Cohen |
| H1790 H | 3/1999 | Coleman |
| 5,917,405 A | 6/1999 | Joao |
| 6,038,257 A * | 3/2000 | Brusewitz et al. ...... 375/240.21 |
| 6,307,526 B1 | 10/2001 | Mann |
| 6,317,039 B1 | 11/2001 | Thomason |
| 6,583,807 B2 * | 6/2003 | Chang et al. ............. 348/14.08 |
| 6,690,273 B2 | 2/2004 | Thomason |
| 6,711,175 B1 | 3/2004 | Rautiainen et al. |
| 6,847,403 B1 * | 1/2005 | Forsberg et al. ............. 348/373 |
| 6,904,175 B2 | 6/2005 | Chao et al. |
| 2002/0099766 A1* | 7/2002 | Tuli ........................... 709/203 |
| 2007/0168426 A1* | 7/2007 | Ludwig et al. .............. 709/204 |

* cited by examiner

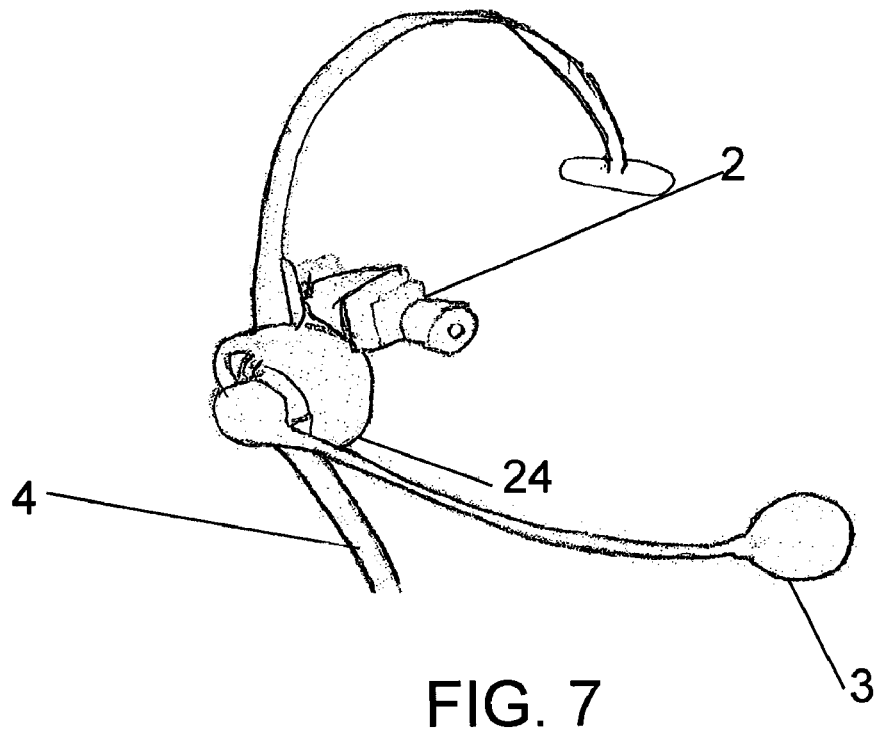
FIG. 7
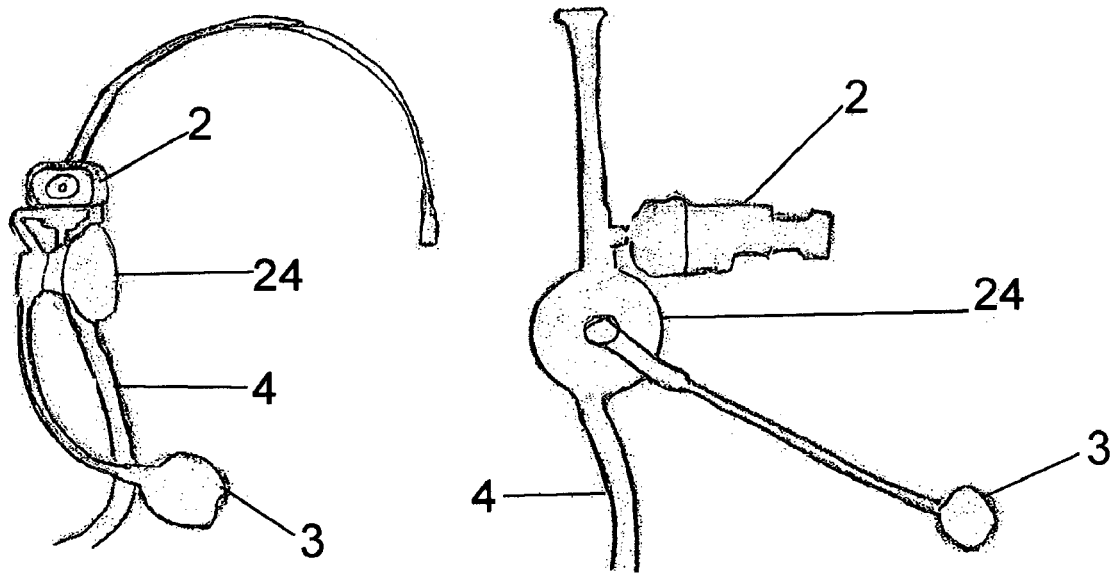
FIG. 8
FIG. 9

WIRELESS TELEPRESENCE COLLABORATION SYSTEM

PRIORITY STATEMENT & CROSS-REFERENCE TO RELATED APPLICATIONS

This application claims priority from co-pending U.S. Patent Application No. 60/336,014, entitled "Wireless Endpoint for Videoconferencing" and filed on Dec. 5, 2001, in the names of Adam Taylor Reuf, et al; which is hereby incorporated by reference for all purposes.

BACKGROUND OF THE INVENTION

This invention relates generally to the field of computer supported collaborative work between plural users, and more particularly to a system for capturing and transmitting, via wireless means, images and sound of the user's immediate surroundings to as well as receiving images and audio from one or more other parties via a network connection in order to achieve a basic form of telepresence.

Colaborative work often requires one or more parties to physically travel to a common location where the work is to be done. For example, an expert technician from headquarters will travel to a plant location to assist the local technician in troubleshooting and correcting an equipment problem. Said travel is time consuming and expensive, and can result in substantial delays in remedying a manufacturing issue requiring specialized technical expertise. In addition to technical field service, other examples where a visual means of collaborating on a task might be preferred over travel include security operations, home healthcare, emergency services, real-estate sales, various types of training and building inspections.

While the telephone is a very useful means of communicating over long distances, the absence of a real-time visual component limits its effectiveness in situations where verbal description is inadequate. Videoconferencing has evolved to include dedicated as well as desktop (PC-based) systems that allow two or more parties to "see" each other via images transmitted across a computer network. Typically, each party sits in front of a camera a used to capture the image to be sent and a monitor to display the image being received. A microphone and speaker assembly perform the same functions for sound. Supplemental images are often captured using additional cameras, typically on a fixed copy stand assembly. Images generated using a personal computer or video recording device can also be transmitted and received. None of these solutions provide a real-time first person perspective or the ease of mobility afforded by the invention.

Recent advances in cellular telephony have seen the integration of low resolution cameras to cellular handsets. Due to the limited bandwidth of the cellular wireless network and the limited processing power of the handset, these phone/camera combinations offer only low resolution, still images that take several minutes to send.

Wearable computing has evolved to offer a wide array of application specific solutions for stock keeping, point of sale, meter reading to name a few. No prior art has yet combined the required user interface, processing power, compression technology and ergonomics to provide the unique personal telepresence solution described herein.

Prior art in the related fields of the invention include the following patents:
(1) U.S. Pat. No. 4,845,636, entitled "Remote Transaction System" issued in the name of Mark E. Walker on Jul. 4, 1989; (2) U.S. Pat. No. 4,847,894, entitled "Device for Aiding Maintenance of an Electromechanical Installation Having Automatic Monitoring and Control Means" issued in the names of Chanvin et. al. on Jul. 11, 1989; (3) U.S. Pat. No. 4,965,819, entitled "Video Conferencing System for Courtroom and Other Applications" issued in the name of Deno Kannes on Oct. 23, 1990; (4) U.S. Pat. No. 5,010,399, entitled "Video Transmission and Control System Utilizing Internal Telephone Lines" issued in the names of Goodman et al. on Apr. 23, 1991; (5) U.S. Pat. No. 5,164,979, entitled "Security System Using Telephone Lines to Transmit Video Images to Remote Supervisory Location" issued in the name of Hyun J. Choi on Nov. 17, 1992; (6) U.S. Pat. No. 5,202,759, entitled "Surveillance System" issued in the name of John Laycock on Apr. 13, 1993; (7) U.S. Pat. No. 5,382,943, entitled "Remote Monitoring Unit" issued in the name of Mutuo Tanaka on Jan. 17, 1995; and (8) U.S. Pat. No. 6,307,526, entitled "Wearable Camera System With Viewfinder Means" issued in the name of Steve G. Mann on Oct. 23, 2001.

BRIEF SUMMARY OF THE INVENTION

In accordance with a preferred embodiment of the invention, a wireless endpoint for personal telepresence comprises a small, lightweight, portable wireless unit (camera, display, microphone, speaker/earphone and wireless tranceiver) of size, weight and shape to allow it to be worn by the user or otherwise affixed and positioned to capture video of the user's immediate surroundings, receive video images from one or more parties, as in a videoconference, as well as provide for exchange of two-way audio. Said video and audio streams are relayed to a computer network via a presence server. Said presence server provides the necessary media and format conversion of the video and audio to make it compatible with the network and other endpoints in the communication. Return video and audio from other parties, as in a videoconference, is received by the portable wireless unit where it can be viewed on the display and output through a speaker/earphone.

The purpose of the present invention is to provide an apparatus for exchanging video and audio across a computer network to allow two (or more) people at different locations to visualize the same first-person perspective in real time. This allows collaboration on tasks requiring visual queues without the need for either party to travel or otherwise spend time getting to the location where the task is to be performed. The image quality must be of such a quality as to allow a person viewing the images of the task to have approximately the same viewpoint as the person performing the task. Accomplishing this requires a specialized compression technique devised to provide clear images from a camera that may be head mounted and constantly moving, thereby causing the entire image field to change, instead of just a portion of it as would be the case with conventional videoconferencing.

Other objects and advantages of the present invention will become apparent from the following descriptions, taken in connection with the accompanying drawings, wherein, by way of illustration and example, embodiments of the present invention is disclosed.

BRIEF DESCRIPTION OF THE SEVERAL VIEWS OF THE DRAWING

FIGS. 7-9 depict three views of a preferred embodiment of a headset assembly comprised of a miniature video camera, microphone and earphone.

DETAILED DESCRIPTION OF THE INVENTION

Detailed descriptions of the preferred embodiments are provided herein. It is to be understood, however, that the present invention may be embodied in various forms. Therefore, specific details disclosed herein are not to be interpreted as limiting, but rather as a basis for teaching one skilled in the art to employ the present invention in virtually any appropriately detailed system, structure or manner.

Figure 1:
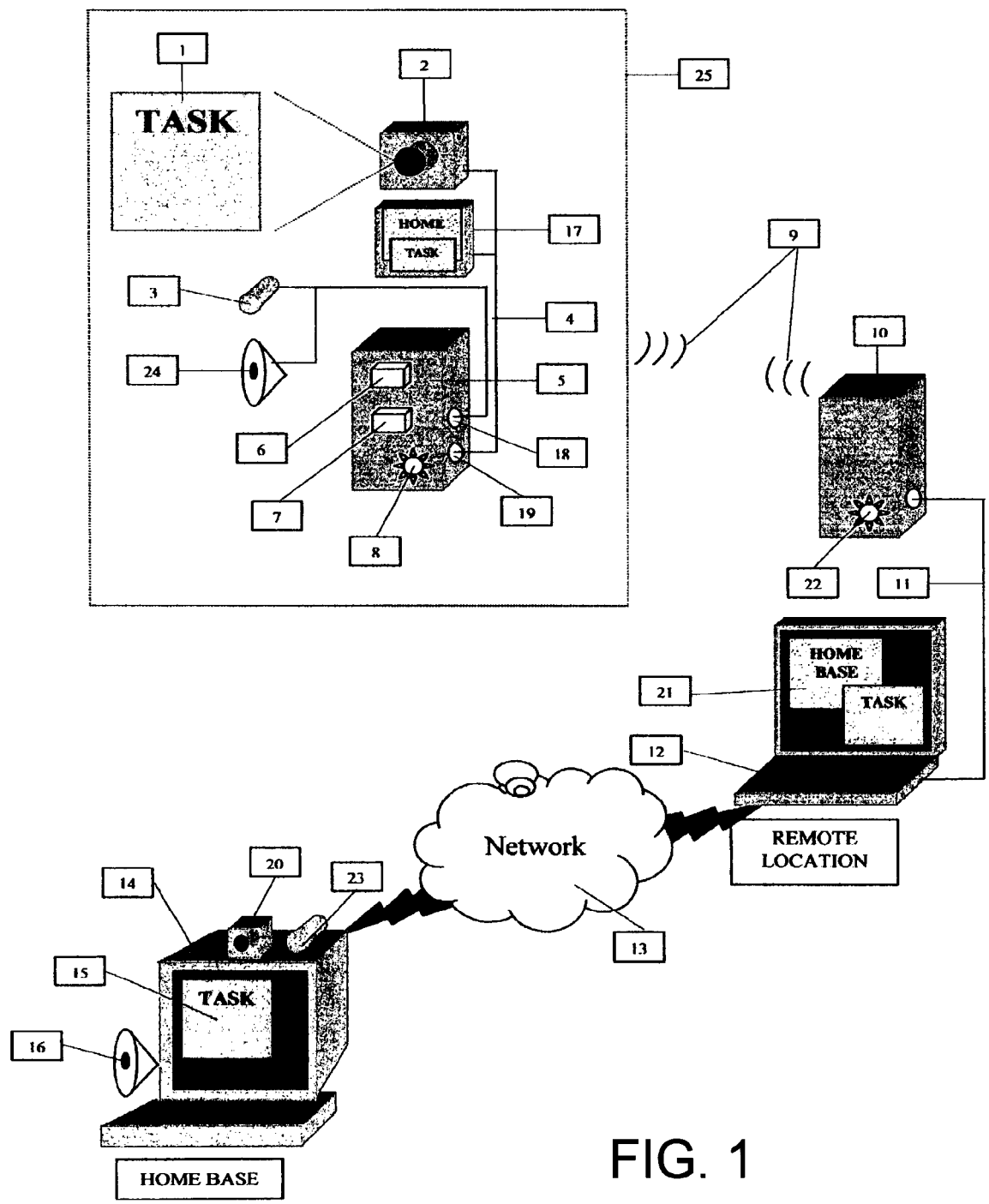
FIG. 1 depicts a perspective view of an analog wireless telepresence collaboration system in the context of a computer network.

FIG. 1 depicts a perspective view of an analog wireless telepresence collaboration system in the context of a network. Numerical references in the following refer to the numbered items in the figure. NOTE: Power supply to the various components of the invention are assumed and not shown for clarity.

In a preferred embodiment of the invention, the user of the portable wireless unit 25 is a technician at a REMOTE LOCATION and needing the assistance of a colleague (at HOME BASE) on a task to be performed. The miniature video camera 2 is positioned by the user, either by wearing it on their person or affixing it to another object, so as to capture images of the TASK 1 being performed. The display 17 reveals the image being captured by the camera. Microphone 3 and earphone/speaker 24 allow two-way voice communication with other parties, as in a videoconference. Camera, display, microphone, earphone/speaker are connected 4 to a wireless tranceiver 5. In addition to a power switch 6, the wireless tranceiver has a capture start/stop control 7, a frequency selector control 8, a video input connector 18 and an audio connector 19. Video and audio are transmitted via wireless 9 to a presence server 10. The presence server converts the wireless video and audio to a media and format 11 compatible with the network and management console 14. The presence server has a frequency selector control 22. The management console is connected to the network 13.

In a preferred embodiment, the miniature video camera 2 is comprised of the model SCM-251 by Fong Kai Industries, Richardson, Tex. fitted with a 6 mm focal length board camera lens and infrared cut filter and conforming to the NTSC video standard.

In a preferred embodiment of the invention, the microphone 3 and earphone/speaker 24 are comprised of the model KX-TCA88 hands-free headset by Panasonic Corp., Secaucus, N.J.

In a preferred embodiment, the wireless tranceiver includes:

a model TM090100 video/audio transmitter by Lawmate, Taipei, Taiwan;

and a model RX09010 video/audio receiver by Lawmate, Taipei, Taiwan.

In a preferred embodiment, the presence server comprises a model RX09010 video/audio receiver by Lawmate, Taipei, Taiwan;

a model TMO90100 video/audio transmitter by Lawmate, Taipei, Taiwan;

a model USBAV-170 video capture cable by ADS Technologies, Cerritos, Calif.;

a video codec capable of compressing/decompressing video at a 200:1 compression ratio in real time, such as the wavelet codec by Vianet Technology, Plano, Tex.; and a MICROSOFT WINDOWS® compatible computer of at least 500 MHZ processing speed, at least one USB port and a suitable network connection.

In a preferred embodiment, the management console (14) comprises a MICROSOFT WINDOWS® compatible computer of at least 500 MHZ processing speed and a suitable network connection.

At HOME BASE, the management console 14 is connected to the same network and displays the video image of the TASK 15 and renders the corresponding audio through a speaker or headphone 16. A camera 20 captures and sends video to be displayed on the presence server 21 and the display 17 in the field. A microphone 23 captures audio to be sent to the REMOTE LOCATION user's speaker/earphone.

Figure 2:
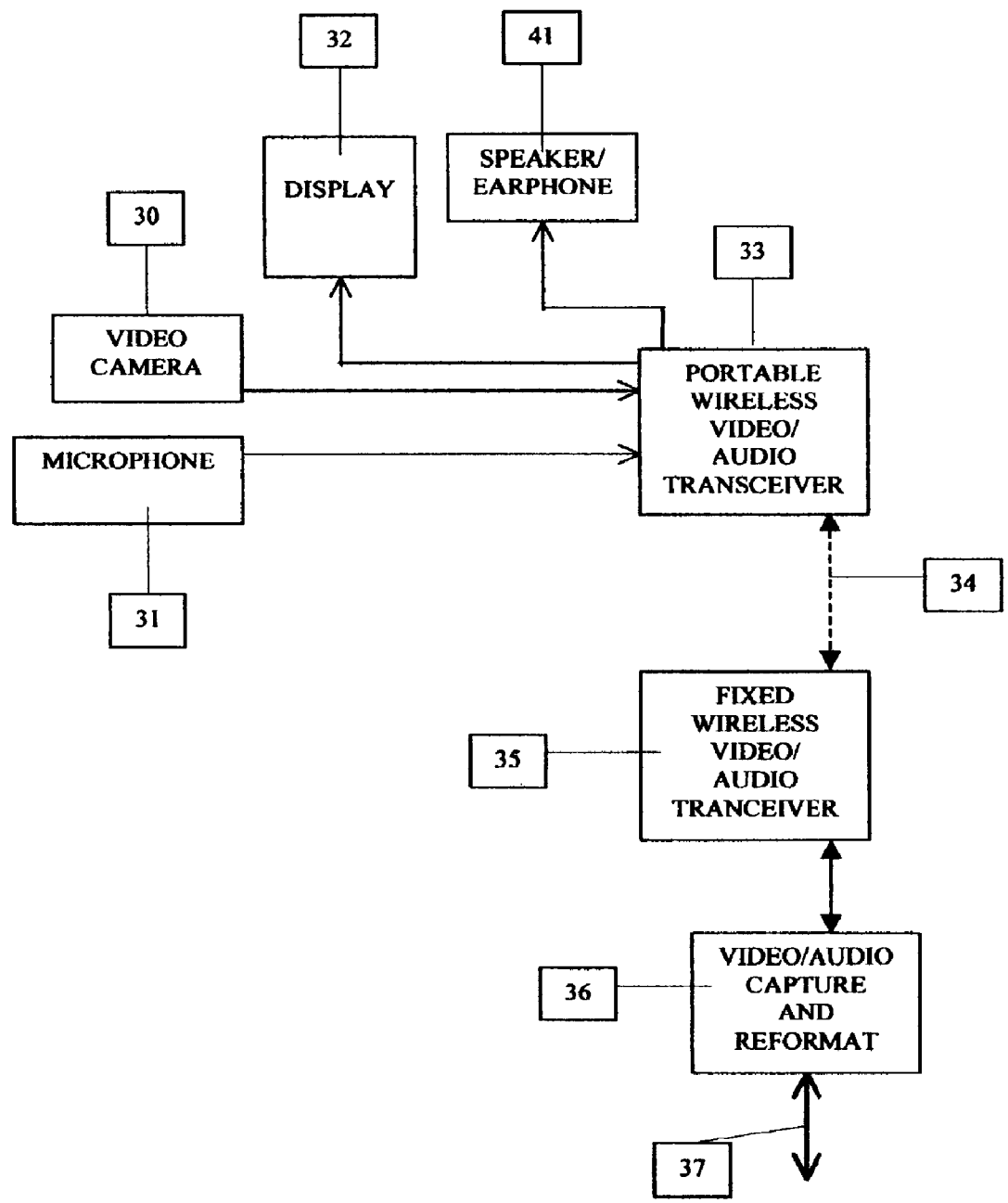
FIG. 2 depicts a schematic depicting the main components of an analog wireless telepresence collaboration system.

FIG. 2 depicts a schematic of the main components of a wireless telepresence collaboration system. NOTE: Power supply to the various components of the invention are assumed and not shown for clarity.

The output of the miniature video camera 30 is connected to a wireless video/audio tranceiver 33. The output of microphone 31 is connected to wireless video/audio tranceiver 33. Video and audio are transmitted 34 to a fixed tranceiver 35 which is connected to a presence server 36. The presence server compresses the audio and video and reformats it to be compatible with the network. The presence server is connected to a network 37. The network serves to transport formatted video and audio to and from the presence server.

Video and audio is received from the network and unformatted and decompressed at the presence server 36 where it is converted to video and audio signals and sent to a fixed wireless video/audio tranceiver 35. Video and audio is transmitted wirelessly 34 to a portable wireless tranceiver 33 where the video and audio is rendered on the display 32 and a speaker/earphone 41.

Figure 3:
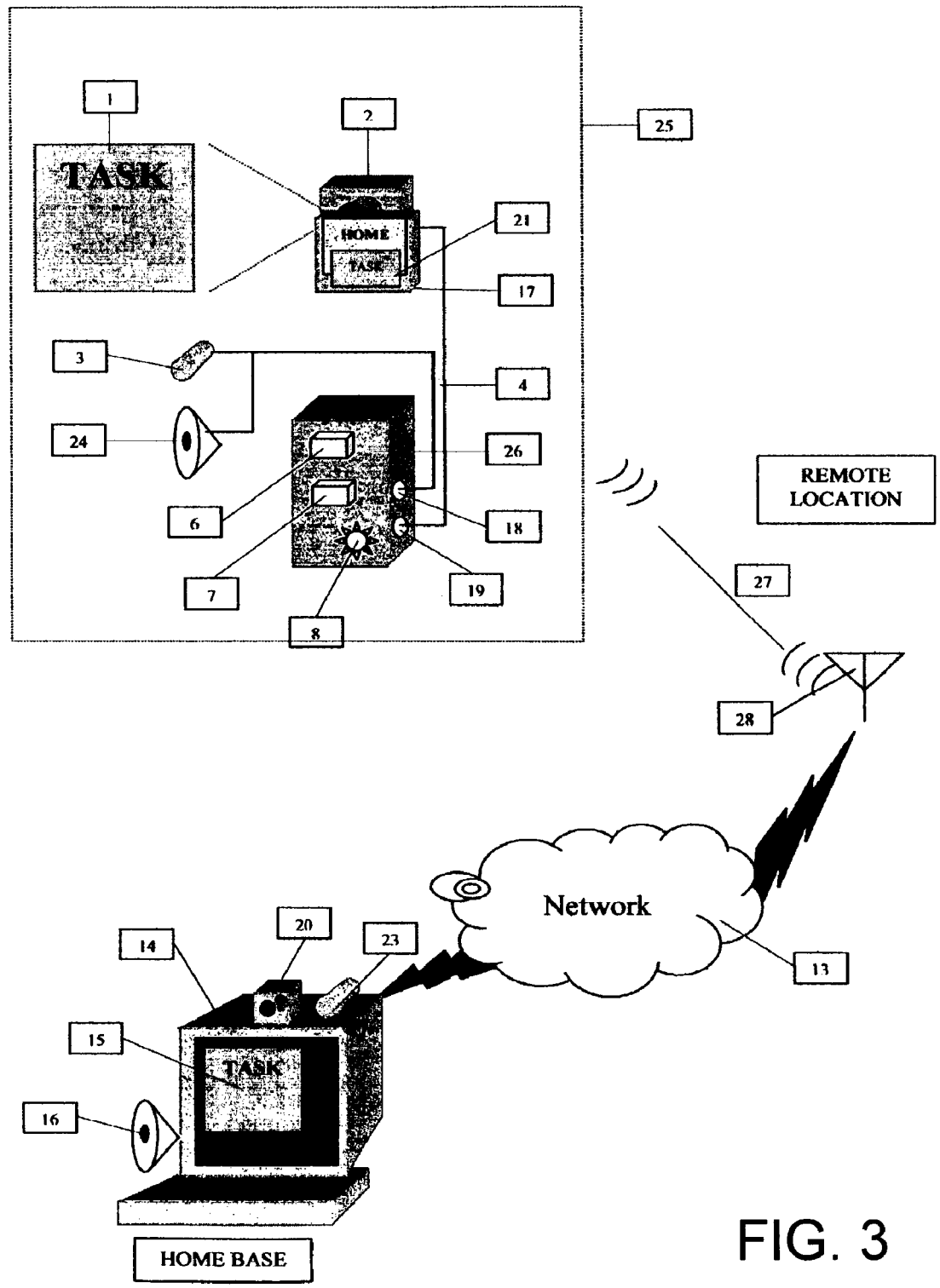
FIG. 3 depicts a perspective view of a digital wireless telepresence collaboration system in the context of a computer network.

FIG. 3 depicts a perspective view of a digital wireless telepresence collaboration system in the context of a network. Numerical references in the following refer to the numbered items in the figure. NOTE: Power supply to the various components of the invention are assumed and not shown for clarity.

In another preferred embodiment of the invention, the user of the portable wireless unit 25 is a technician at a REMOTE LOCATION and needing the assistance of a colleague (at HOME BASE) on a task to be performed. The miniature video camera 2 is positioned by the user, either by wearing it on their person or affixing it to another object, so as to capture images of the TASK 1 being performed. The display 17 reveals the image being captured by the camera or being received from the management console 14 at HOME BASE. Microphone 3 and earphone/speaker 24 allow two-way voice communication with other parties, as in a videoconference.

Camera, display, microphone, earphone/speaker are connected 4 to a presence server/wireless tranceiver 26. In addition to a power switch 6, the presence server/wireless tranceiver has a capture start/stop control 7, a frequency selector control 8, a video input connector 18 and an audio connector 19. The presence server/wireless tranceiver 26 converts the video and audio to a media and format compatible with the network and management console 14. The presence server/wireless tranceiver also has a frequency selector control 22. The presence server/wireless tranceiver is connected to the network 13 via a wireless access point 28. The presence server/wireless tranceiver transmits and receives video and audio over the wireless connection 27. The management console is also connected to the network 13.

In a preferred embodiment, the miniature video camera 2 is comprised of the model SCM-251 by Fong Kai Industries, Richardson, Tex. fitted with a 6 mm focal length board camera lens and infrared cut filter.

In a preferred embodiment of the invention, the microphone 3 and earphone/speaker 24 are comprised of the model KX-TCA88 hands-free headset by Panasonic Corp., Secaucus, N.J. In a preferred embodiment, the presence server/wireless tranceiver 26 includes: a handheld computer running MICROSOFT WINDOWS®, such as the model iPaq 3950 by HP/Compaq Computer, Houston, Tex.;

a video capture accessory, such as the model FlyJacket expansion accessory and video capture system by Animation Technologies, Taipei, Taiwan;

an 802.11b compatible wireless LAN adapter, such as model DCF-660W compact flash wireless ethernet adapter by D-Link, Irvine, Calif.; and a video codec capable of compressing/decompressing video at a 200:1 compression ratio in real time, such as the wavelet codec by Vianet Technology, Plano, Tex.

In a preferred embodiment, the management console (14) comprises a MICROSOFT WINDOWS® compatible computer of at least 500 MHZ processing speed and a suitable network connection.

At HOME BASE, the management console 14 is connected to the same network and displays the video image of the TASK 15 and renders the corresponding audio through a speaker or headphone 16. A camera 20 captures and sends video to be displayed on the presence server 21 and the display 17 in the field. A microphone 23 captures audio to be sent to the FIELD user's speaker/earphone.

Figure 4:
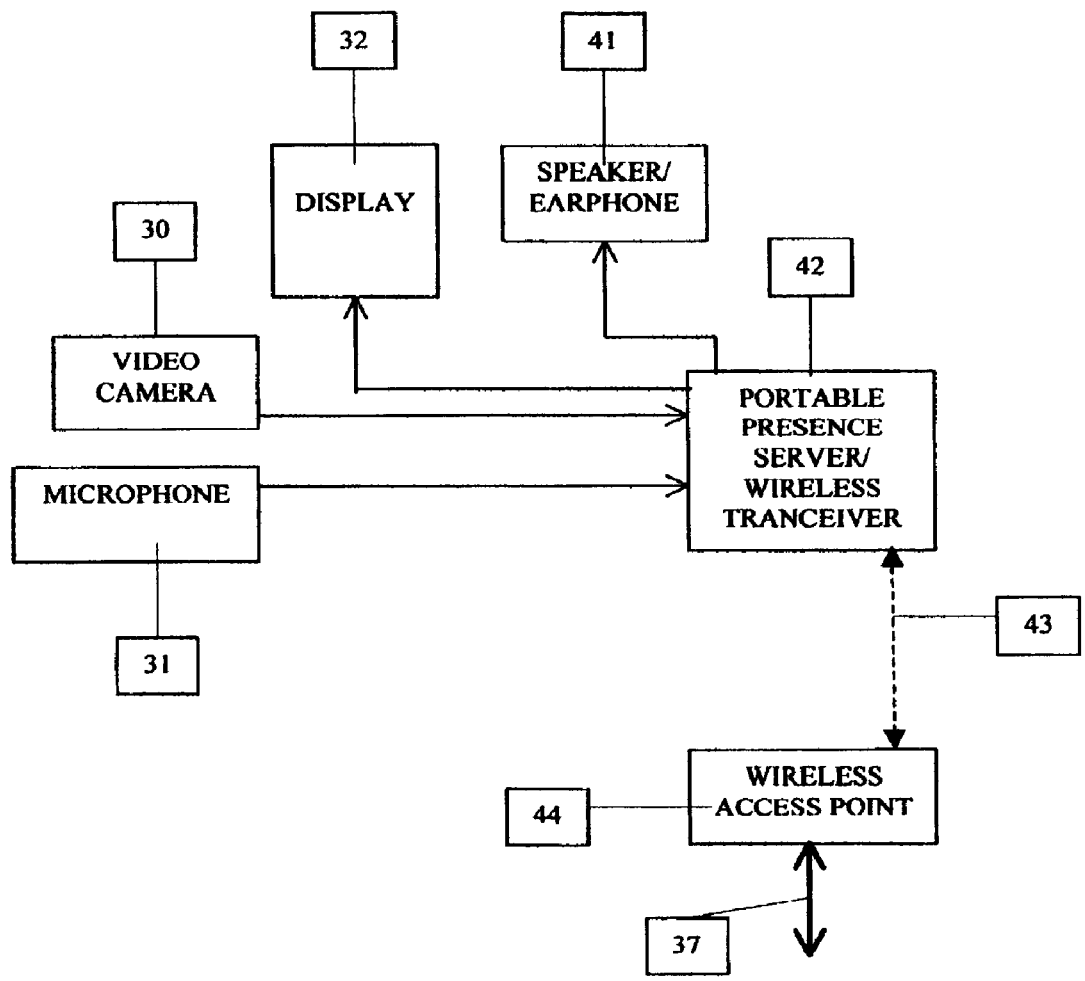
FIG. 4 depicts a schematic depicting the main components of a digital wireless telepresence collaboration system.

FIG. 4 is a schematic depicting the main components of a wireless (digital) endpoint for personal telepresence. NOTE: Power supply to the various components of the invention are assumed and not shown for clarity.

The output of the miniature video camera 30 is connected to a portable presence server/wireless tranceiver 42. The output of a microphone 31 is connected to a portable presence server/wireless tranceiver 42. Video and audio signals are compressed, reformatted and transmitted in digital format 43 to a wireless access point 44 which is connected to a network 37.

Video and audio from the network is transmitted by the wireless access point 44 to the presence server 42. Video and audio are unformatted and decompressed by the portable presence server/wireless tranceiver 42. Video and audio is then rendered on the display 32 and a speaker/earphone 41.

Figure 5:
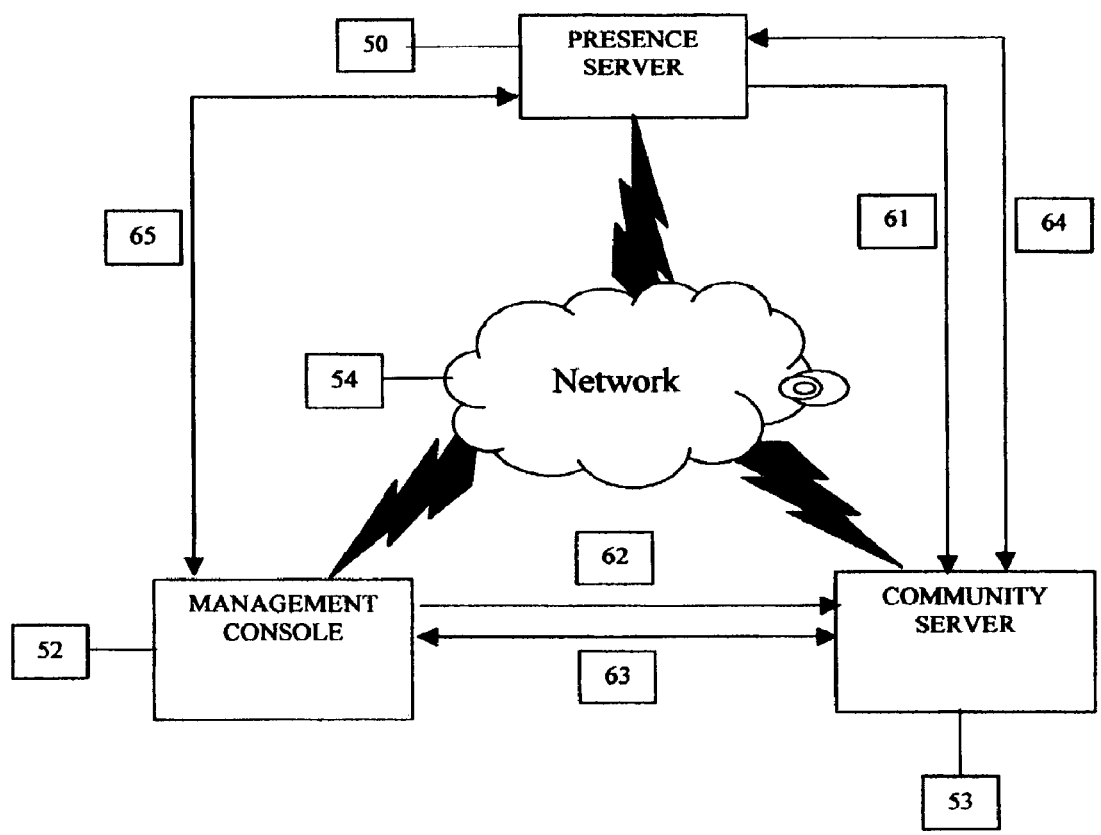
FIG. 5 depicts a schematic depicting the main components of a wireless telepresence collaboration system including a community server.

FIG. 5 is a schematic depicting the major elements of a network connection between a presence server and a management console managed by a community server.

In another preferred embodiment of the invention, exchange of video and audio between the presence server and the management console is initiated and managed by a community server connected to the same network. This addresses situations wherein either the presence server or the management console reside inside a secure firewall, thereby preventing direct communication with any parties outside said firewall. When the presence server 50 is activated, it initiates contact 61 with the community server 53, thereby establishing a two-way connection with the community server 64 for video and audio exchange. Likewise, the management console 52 initiates contact 62 with the community server and establishes a two-way connection with the community server 63 for video and audio exchange. Once both the presence server and the management console have established two-way communications with the community server, an access control function in the community server enables communication from the presence server to the management console and vice versa. This example illustrates communication between two parties, as in a videoconference. The scope of this invention is intended to include communication between three or more parties, through the addition of presence servers and/or management consoles as appropriate.

In a preferred embodiment, the community server comprises an INTEL PENTIUM® class computer running MICROSOFT WINDOWS®.

Another preferred embodiment allows for a direct, peer to peer, two party communication to be established with the assistance of the community server. This addresses situations wherein direct communications is possible, but the network address of one or the other party is not known. The presence server 50 and management console 52 each initiate contact with the community server 53, and upon doing so learn the network address of each other, thereby enabling a direct connection 65 to be established between the presence server and the management console.

Another preferred embodiment detects available bandwidth on the communication link and automatically adjusts the video frame rate and image resolution accordingly. The presence server and management console each use a similar mechanism to regularly monitor their respective communication link to determine the available bandwidth for sending video and audio. This measurement in turn is used to dynamically adjust the frame rate, image resolution or both for video being sent.

Another preferred embodiment provides a motion processing mechanism to compensate for camera movement in the video compression technique. Such a motion processing mechanism consists of analyzing the changes in video images (i.e. individual frames) and discarding frames as needed to maintain image quality and minimize image latency. Methods are well known in the prior art to reduce bandwidth usage by detecting regions of an image that differ from frame to frame. The methods include strategies to encode, transmit, detect, and decode only those regions. This preferred embodiment improves the usefulness of a wireless collaboration system by including an implementation of these methods and strategies, such as provided by the Vianet Technologies, Inc. wavelet encoder. This embodiment extends the art by also including a method to completely eliminate frames that are "too late" to be useful due to camera motion. When the camera quickly moves, the method discards frames that were generated during the rapid movement allowing communication link bandwidth, presence server, and console image processing to focus on the useful frames derived when the motion stops.

Another preferred embodiment provides for encryption of video and audio at its source (either the presence server or the management console), using encryption such as the hierarchical encryption scheme offered by Asier Technology, Piano, Tex. In such an embodiment, video and audio are first compressed and formatted, then processed by said encryption scheme before being transmitted across any communication link. Conversely, encrypted video and audio, once received, are first unencrypted, then decompressed for display and playback.

Figure 6:
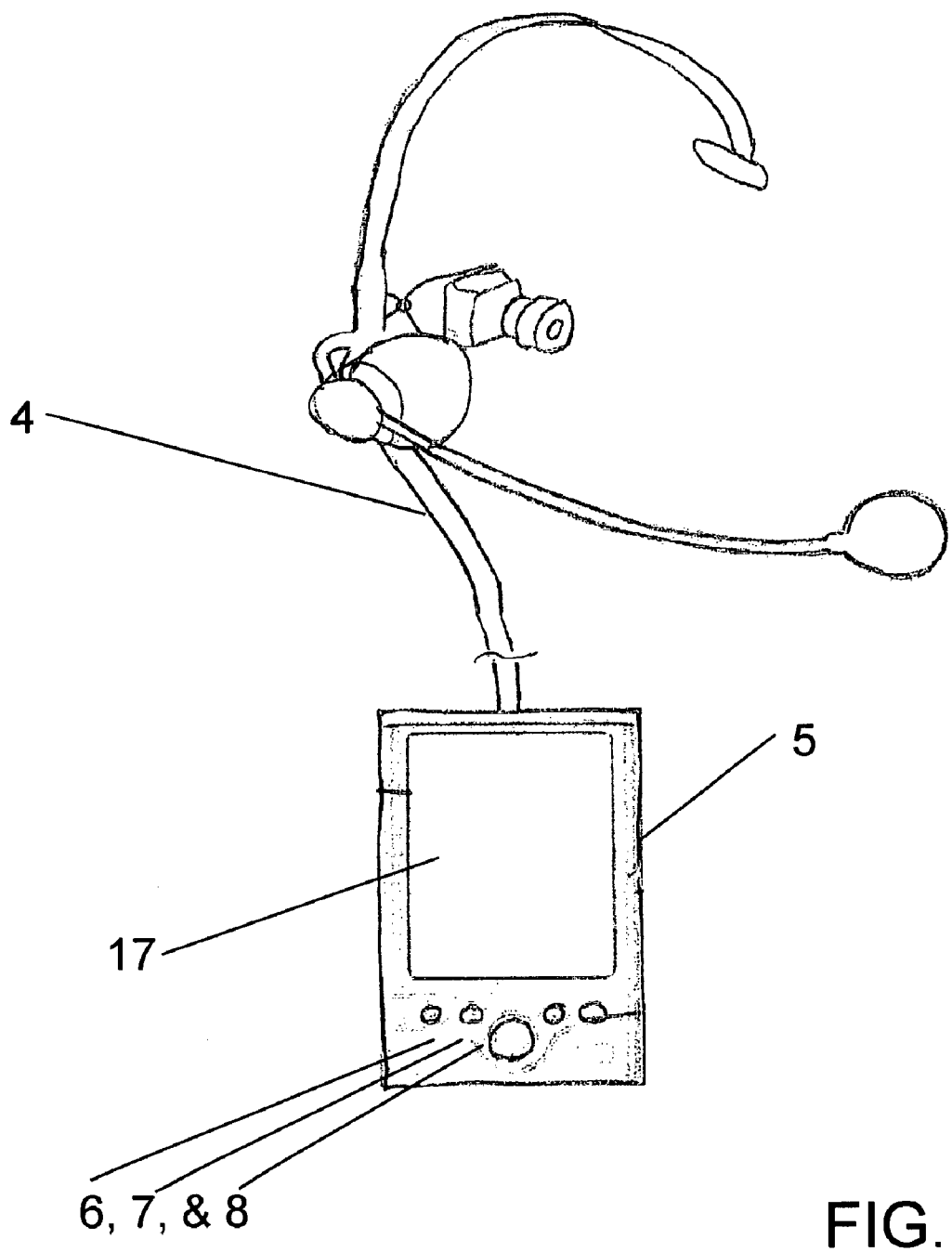
FIG. 6 depicts a preferred embodiment of the portable wireless unit.

FIG. 6 depicts a preferred embodiment of the portable wireless unit comprising a wireless tranceiver and headset assembly. The headset assembly comprising a miniature video camera, microphone, earphone and headband is connected to the wireless tranceiver via a cable harness. Various controls and the display are disposed on the front of the wireless tranceiver.

FIGS. 7-9 depict a preferred embodiment of the headset assembly in three views. FIG. 7 depicts a perspective view. FIG. 8 depicts an elevation view. FIG. 9 depicts a profile view.

While the invention has been described in connection with preferred embodiments, these are not intended to limit the scope of the invention to the particular form set forth, but on the contrary, are intended to cover such alternatives, modifications, and equivalents as may be included within the spirit and scope of the invention as defined by the appended claims.

We claim:

1. A system for providing wireless collaboration between a first person and a second person over a network, the system comprising:
   a management console disposed with the first person, the management console for compressing video and audio generated by the first person and transmitting the compressed video and audio over the network;
   a portable wireless unit disposed with the second person at a location remote to the management console, the portable wireless unit for wirelessly receiving decompressed video and audio generated by the first person and rendering the decompressed video and audio to the second person; and
   a presence server disposed for wirelessly relaying video and audio communications from the network to the portable wireless unit, the presence server for receiving from the network compressed video and audio generated by the first person, decompressing the compressed video and audio, and wirelessly transmitting the decompressed video and audio to the portable wireless unit.

2. The system as recited in claim 1, wherein the first person comprises an expert and the second person comprises a technician, the expert employing the management console to assist the technician with a task being performed by the technician.

3. The system as recited in claim 1, wherein the portable wireless unit and the presence server are colocated while maintaining the wireless communication therebetween.

4. The system as recited in claim 1, wherein the management console formats the video and audio generated by the first person.

5. The system as recited in claim 1, wherein the management console detects the available bandwidth on the network and adjusts frame rate and picture quality associated with the video.

6. The system as recited in claim 1, wherein the portable wireless unit further comprises equipment selected from the group consisting of miniature video cameras, displays, microphones, and speakers/earphones.

7. The system as recited in claim 1, wherein the presence server deformats the decompressed video and audio prior to transmitting the decompressed video and audio.

8. A system for providing wireless collaboration between a first person and a second person over a network, the system comprising:
   a management console disposed with the first person, the management console for receiving from the network compressed video and audio generated by the second person, decompressing the compressed video and audio, and rendering the decompressed video and audio to the first person;
   a portable wireless unit disposed with the second person at a location remote to the management console, the portable wireless unit for wirelessly transmitting video and audio generated by the second person; and
   a presence server disposed for wirelessly relaying video and audio communications from the portable wireless unit to the network, the presence server for wirelessly receiving from the portable wireless unit the video and audio generated by the second person, compressing the video and audio, and transmitting the compressed video and audio over the network.

9. The system as recited in claim 8, wherein the first person comprises an expert and the second person comprises a technician, the expert employing the management console to visualize a task being performed by the technician.

10. The system as recited in claim 8, wherein the portable wireless unit and the presence server are colocated while maintaining the wireless communication therebetween.

11. The system as recited in claim 8, wherein the management console deformats the video and audio generated by the second person.

12. The system as recited in claim 8, wherein the portable wireless unit further comprises equipment selected from the group consisting of miniature video cameras, displays, microphones, and speakers/earphones.

13. The system as recited in claim 8, wherein the presence server formats the decompressed video and audio prior to transmitting the decompressed video and audio.

14. The system as recited in claim 8, wherein the presence server detects the available bandwidth on the network and adjusts frame rate and picture quality associated with the video.

15. A method for providing wireless collaboration between a first person and a second person over a network, the method comprising:
   compressing video and audio at a management console, the video and audio being generated by the first person;
   transmitting the compressed video and audio over the network;
   receiving the compressed video and audio from the network at a presence server;
   decompressing the compressed video and audio at the presence server;
   wirelessly transmitting the decompressed video and audio from the presence server;
   wirelessly receiving the decompressed video and audio at a portable wireless unit, the portable wireless unit being disposed with the second person at a location remote to the management console; and
   rendering the decompressed video and audio to the second person.

16. The method as recited in claim 15, further comprising:
   formatting the video and audio generated by the first person at the management console; and
   deformatting the decompressed video and audio at the presence server.

17. The method as recited in claim 16, further comprising detecting the available bandwidth on the network at the management console and adjusting frame rate and picture quality associated with the video.

18. A method for providing wireless collaboration between a first person and a second person over a network, the method comprising:

capturing video and audio generated by the second person at a portable wireless unit;

wirelessly receiving the video and audio from the portable wireless unit at a presence server;

compressing the video and audio at the presence server;

transmitting the compressed video and audio from the presence server over the network;

receiving the compressed video and audio at a management console connected to the network, the management console being disposed with the first person at a location remote from the portable wireless unit;

decompressing the compressed video and audio at the management console; and rendering the decompressed video and audio to the first person.

19. The method as recited in claim 18, further comprising:

formatting the video and audio generated by the second person at the presence server; and deformatting the decompressed video and audio at the management console.

20. The method as recited in claim 18, further comprising detecting the available bandwidth on the network at the presence server and adjusting frame rate and picture quality associated with the video.

* * * * *